(12) United States Patent
Montigny et al.

(10) Patent No.: US 10,221,814 B2
(45) Date of Patent: Mar. 5, 2019

(54) VALVE DEVICE FOR A MOTOR VEHICLE

(71) Applicant: CONTINENTAL AUTOMOTIVE GMBH, Hannover (DE)

(72) Inventors: Sybille Montigny, Bad Soden (DE); Joachim von Willich, Selters (DE); Peter Kohlen, Neu Anspach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/654,322

(22) PCT Filed: Dec. 5, 2013

(86) PCT No.: PCT/EP2013/075708
§ 371 (c)(1),
(2) Date: Jun. 19, 2015

(87) PCT Pub. No.: WO2014/095404
PCT Pub. Date: Jun. 26, 2014

(65) Prior Publication Data
US 2016/0195044 A1 Jul. 7, 2016

(30) Foreign Application Priority Data
Dec. 20, 2012 (DE) .................. 10 2012 224 093

(51) Int. Cl.
*F02M 26/70* (2016.01)
*F02M 26/72* (2016.01)
(Continued)

(52) U.S. Cl.
CPC ............ *F02M 26/70* (2016.02); *F02M 26/68* (2016.02); *F02M 26/72* (2016.02); *F16K 1/2261* (2013.01); *F16K 27/0218* (2013.01); *F16K 47/08* (2013.01)

(58) Field of Classification Search
CPC .... F16K 47/08; F16K 27/0218; F16K 1/2261; F02M 26/70; F02M 26/72
(Continued)

(56) References Cited

U.S. PATENT DOCUMENTS 2,089,771 A * 8/1937 Swinney ................. F02D 9/102
　　　　　　　　　　　　　　　　　　　123/184.45
2,414,751 A * 1/1947 Ludeman ................ F16K 27/00
　　　　　　　　　　　　　　　　　　　251/124
(Continued)

FOREIGN PATENT DOCUMENTS

CN　　101225773　　7/2008
DE　　10147333 A1　4/2003
(Continued)

OTHER PUBLICATIONS

Office Action dated Oct. 27, 2016 which issued in the corresponding Chinese Patent Application No. 201380066855.8.

Primary Examiner — Marina Tietjen
(74) Attorney, Agent, or Firm — Cozen O'Connor

(57) ABSTRACT

A valve device for a motor vehicle includes: a housing; a flow duct situated in the housing; and a flap arranged in the flow duct to close off the flow duct, the flap having regions in which a shaft penetrating the flap is fastened. The shaft is rotatably mounted in the housing and a valve seat is arranged in the flow duct, the valve seat being in contact with the flap in the closed position thereof. At least one portion of the flow duct adjacent to the valve seat has a cross section smaller than the inside diameter of the valve seat.

5 Claims, 3 Drawing Sheets

(51) Int. Cl.
*F16K 1/226* (2006.01)
*F16K 27/02* (2006.01)
*F16K 47/08* (2006.01)
*F02M 26/68* (2016.01)

(58) Field of Classification Search
USPC .................................................. 251/305, 118
See application file for complete search history.

(56) References Cited

U.S. PATENT DOCUMENTS

| | | | |
|---|---|---|---|
| 2,920,858 A | | 1/1960 | Hunter |
| 3,747,581 A | * | 7/1973 | Kolb .................. F02M 29/04 |
| | | | 123/590 |
| 4,298,548 A | * | 11/1981 | Pontoppidan ............ F02M 7/24 |
| | | | 261/121.3 |
| 4,340,549 A | * | 7/1982 | McKim .................. F02M 7/22 |
| | | | 123/25 K |
| 4,905,647 A | | 3/1990 | Kizer et al. |
| 6,446,934 B2 | * | 9/2002 | Bonomi .............. F16K 27/0218 |
| | | | 251/306 |
| 6,698,717 B1 | | 3/2004 | Brookshire et al. |
| 6,889,652 B2 | * | 5/2005 | Meiwes .................. F02D 9/104 |
| | | | 123/337 |
| 7,264,221 B2 | | 9/2007 | Yeary et al. |
| 7,264,224 B1 | * | 9/2007 | Weston .................... F16K 1/18 |
| | | | 251/298 |
| 7,866,298 B2 | | 1/2011 | Shimura et al. |
| 8,100,118 B2 | | 1/2012 | Sudmanns |
| 2012/0145134 A1 | | 6/2012 | Miyazaki et al. |

FOREIGN PATENT DOCUMENTS

| | | |
|---|---|---|
| DE | 102006043647 A1 | 4/2007 |
| DE | 10 2007 007 111 A1 | 8/2008 |
| DE | 102007033679 A1 | 1/2009 |
| EP | 0 188 130 A1 | 7/1986 |
| EP | 1 273 786 A2 | 1/2003 |
| EP | 2175180 A1 | 4/2010 |
| JP | 10073167 A | 3/1998 |
| JP | 2002 286148 A | 10/2002 |

\* cited by examiner

VALVE DEVICE FOR A MOTOR VEHICLE

CROSS-REFERENCE TO RELATED APPLICATIONS

This is a U.S. national stage of application No. PCT/EP2013/075708, filed on 5 Dec. 2013, which claims priority to the German Application No. DE 10 2012 224 093.4 filed 20 Dec. 2012, the content of both incorporated herein by reference.

BACKGROUND OF THE INVENTION

1. Field of the Invention

The invention relates to a valve device for a motor vehicle, having a housing, having a flow duct situated in the housing, having a flap which is arranged in the flow duct and which serves for closing off the flow duct, wherein the flap is fastened to a spindle, and the spindle is mounted rotatably in the housing, and having a valve seat which is arranged in the flow duct and which is in contact with the flap when the latter is in its closed position.

2. Related Art

Valve devices are used, for example, as throttle flap connectors or exhaust life gas recirculation valves, and have long been known. By making use of the rotatably mounted flap, it is possible for the flow duct to be completely closed or opened so as to realize a maximum mass throughput. Accordingly, the valve device is designed with regard to the maximum mass throughput and thus with regard to the free flow cross section in the region of the flap. With regard to the regulation of the mass throughput, the greatest difficulty lies in obtaining adequate regulation quality at minimum mass throughput, at which the flap is pivoted by only a few degrees out of the closed state. For this purpose, careful adaptation is necessary with regard to the geometry and material pairings between the flap and the flow duct. For this purpose, it is known to arrange a valve seat in the flow duct in the region of the closed position of the flap, which valve seat is correspondingly adapted to the flap and, if appropriate, to the seal arranged on the circumference of the flap. A disadvantage here is that, for different requirements that demand a different maximum throughput, respectively different valve devices with correspondingly adapted flaps and valve seats must be provided. Owing to the exact adaptation, the different valve devices involve a great amount of outlay.

SUMMARY OF THE INVENTION

It is an object of the invention to provide a valve device with which different maximum mass throughput can be realized with little outlay with only one flow duct cross section.

This object may be achieved in that at least a section of the flow duct adjacent to the valve seat has a cross section smaller than the inner diameter of the valve seat.

Owing to the formation of the smaller cross section in the flow duct, extending only over a part of the length of the flow duct in the valve device, the requirement of the maximum mass throughput is no longer determined by the free cross-sectional area, through which flow can pass, of flap and valve seat, but by the cross-sectional area of the flow duct. This makes it possible for other sections of the flow duct to be formed with other, in particular larger, cross sections. The decisive advantage consists in that, in this way, it is possible to even use relatively large valve seats with corresponding flaps. It is therefore not necessary to develop a new flap with an adapted valve seat for every new maximum mass throughput; rather, it is possible to make use of existing flaps and valve seats. Since the adaptation of flap and valve seat with regard to regulation involves considerably less outlay, the use of existing parts leads to considerable simplification. By contrast, the adaptation of a section of the flow duct to a new, smaller maximum mass throughput involves considerably less outlay, such that a very great number of usage situations is covered by the valve device according to the invention. For example, it is even possible to use existing housing structures, as the adaptation is restricted only to the flow duct.

In an advantageous refinement, the section of the flow duct with the cross section smaller than the inner diameter of the valve seat is arranged downstream of the valve seat. This change to the flow duct can be realized with particularly little outlay, because such valve devices generally have cast metal housings, and the changed flow duct is generated already during the casting process by way of a modified core.

In another refinement, a modified casting process for producing the valve housing is eliminated in that the flow duct with the smaller cross section is formed by an insert, which is arranged in the flow duct and adjacent to the valve seat, wherein the insert has a cross section smaller than the inner diameter of the valve seat. The advantage of this refinement is that not only the valve seat and flap but also the housing can be used no longer just for one usage situation but for all new usage situations. Since the adaptation to new maximum mass throughputs is realized exclusively by way of the insert, all other components can be carried over unchanged. The flow duct merely has to be prepared for receiving the insert. This adaptation can however be produced with little outlay.

In another refinement, the flow duct with the smaller cross section is formed by two inserts, which are arranged in the flow duct, wherein a respective insert is arranged to each side of the valve seat, and both inserts also have the smaller cross section in relation to the inner diameter of the valve seat. With this refinement, within the two inserts, a volume adapted to the smaller maximum mass throughput is created, which improves the regulability by way of the flap arranged between the two inserts.

To permit and ensure a flow around the flap which is as free from turbulence as possible, and thus good regulability, the at least one insert or flow duct is designed such that, in the direction of the valve seat, the smaller cross section widens continuously up to the inner diameter of the valve seat. This refinement has the advantage that the cross-sectional reduction comes to bear only at large opening angles of the flap, whereas at small opening angles, the good regulability owing to the large cross section of the valve seat is maintained.

In a simple refinement, the insert or flow duct with the smaller cross section in relation to the valve seat is of rotationally symmetrical design. If the maximum mass throughput is decreased only slightly, then it may be provided in further advantageous refinements that the insert or the flow duct has a spherical cap-shaped cross-sectional reduction that extends only over a part of the circumference, preferably over a range from 90° to 180° of the circumference.

The arrangement of the valve seat and/or of the respective insert in the flow duct is particularly simple if it is screwed in or pressed in.

Turbulence in the flow owing to the reduced cross section can be reduced by virtue of the cross section merging continuously into the cross section of the flow duct. This means that the diameters of the at least one insert and of the flow duct are equal at this location. This may be realized firstly by way of a reduced cross section in the flow duct. Since, in order for the insert to be received in the flow duct, the latter must have the smaller cross section in any case, the corresponding adaptation to the cross-sectional dimension of the insert involves little outlay.

A continuous transition between flow duct and insert without an adaptation of the flow duct is attained by virtue of the insert having a contour oriented in the direction of the flow duct and widening from the smallest cross section to the cross section of the flow duct. Such widening may be of frustoconical form in the manner of a funnel, or may be formed with a concave or convex shell surface.

In a further refinement, the cross section of the flow duct is subsequently widened again to the original cross section. With this refinement, an undisrupted transition of the flow duct of the housing to the connected components in the flow path is ensured. Additional adaptations or transition parts are not required.

BRIEF DESCRIPTION OF THE DRAWINGS

The invention will be discussed in more detail on the basis of several exemplary embodiments. In the figures.

DETAILED DESCRIPTION OF THE PRESENTLY PREFERRED EMBODIMENTS

Figure 1:
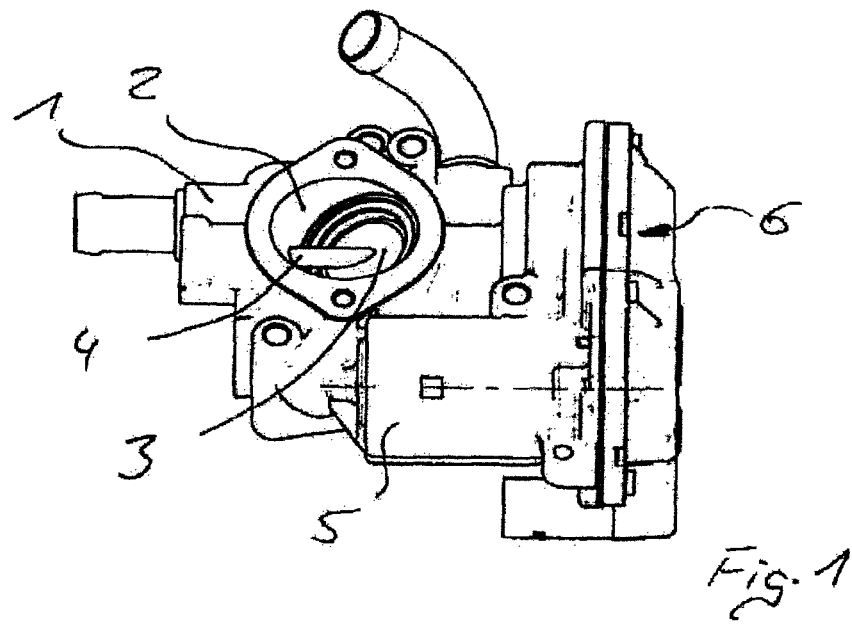
FIG. 1 shows a valve device according to the invention.

FIG. 1 shows an exhaust-gas recirculation valve having a housing 1, and having a flow duct 2, which is situated in the housing and in which there is arranged a disk-shaped flap 3. The flap 3 is fixedly connected to a spindle 4, and the spindle 4 is rotatably mounted in the housing 1. The spindle 4 is driven by an electric motor 5 arranged in the housing 1, wherein a gearing 6 is interconnected between the spindle 4 and electric motor 5.

Figure 2:
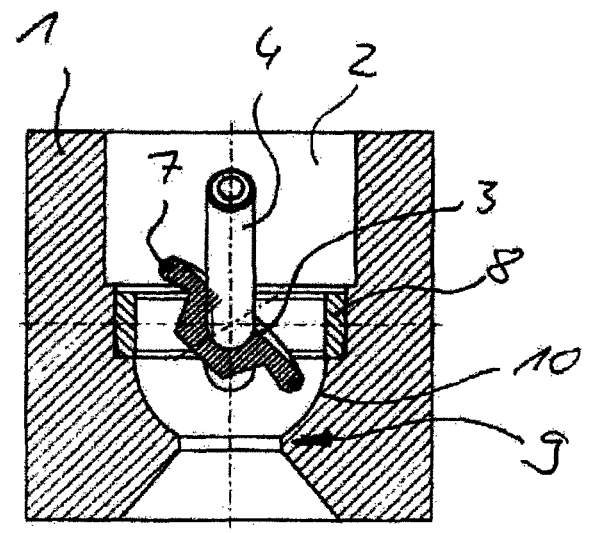
FIG. 2 shows the flow duct of the valve device as shown in FIG. 1.

FIG. 2 shows a part of the flow duct 2 as per FIG. 1 in section. The disk-shaped flap 3 is fastened rotationally conjointly to the spindle 4 by way of a welded connection. In the illustration shown, the flap 3 is approximately halfway open. The sealing is realized here by way of a sealing ring 7, which is arranged in a groove of the flap 3. The sealing ring 7 seals off the flow duct 2 with respect to the inner wall of a ring 8, which is inserted into the flow duct 2, such that the ring acts as a valve seat 8. In the event of a rotation of the spindle 4 clockwise, the flap 3 opens by opening up a flow cross section in the flow duct 2, which flow cross section becomes larger with progressive rotation. The valve seat 8 is pressed into the flow duct 2. Downstream of the valve seat 8 in the flow direction, the flow duct 2 has a section 9 having a cross section in smaller than the inner diameter of the valve seat 8. The cross section of the section 9 defines the maximum mass throughput of the valve device. For a defined flow of the fluid, the cross section of the flow duct 2 widens continuously from the smallest cross section in the section 9 to the valve seat 8, such that the cross section changes without any shoulders or steps. The wall of the flow duct 2 is of concave form in this region 10. Downstream of the section 9 as viewed in the flow direction, the flow duct 2 widens to its original cross section.

Figure 3:
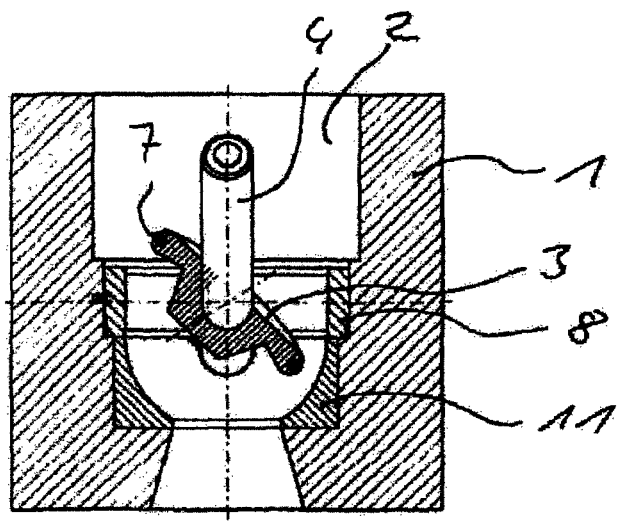
FIGS. 3, 3a and 4 show further embodiments of the valve device of FIG. 1.

FIG. 3 shows a further refinement in which the section 9 is formed not by the flow duct 2 but by an insert 11, wherein the insert 11 has the same inner contour as in FIG. 2.

Figure 3A:
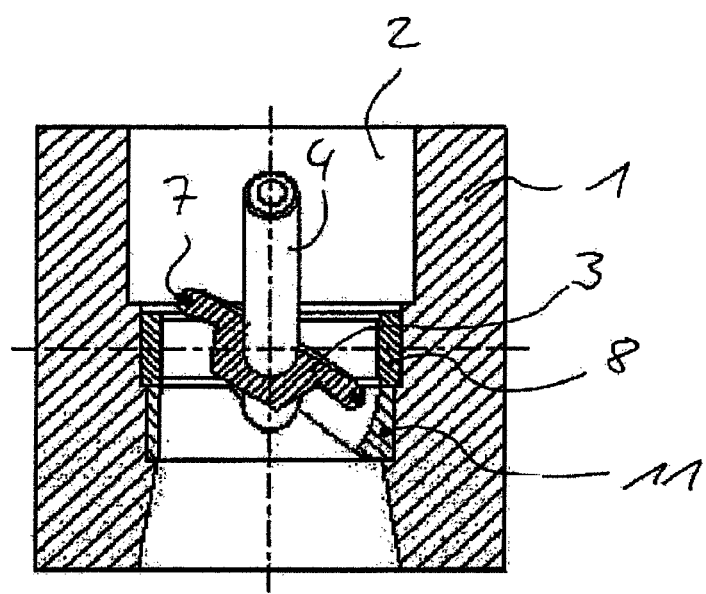

FIG. 3a shows a refinement with an insert as per FIG. 3, wherein the spherical cap-shaped inner contour of the insert 11 extends over 90°, and thus only over a part of the circumference. It is also conceivable for such a spherical cap contour to be formed in the region 10 of the flow duct 2, as per FIG. 2.

Figure 4:
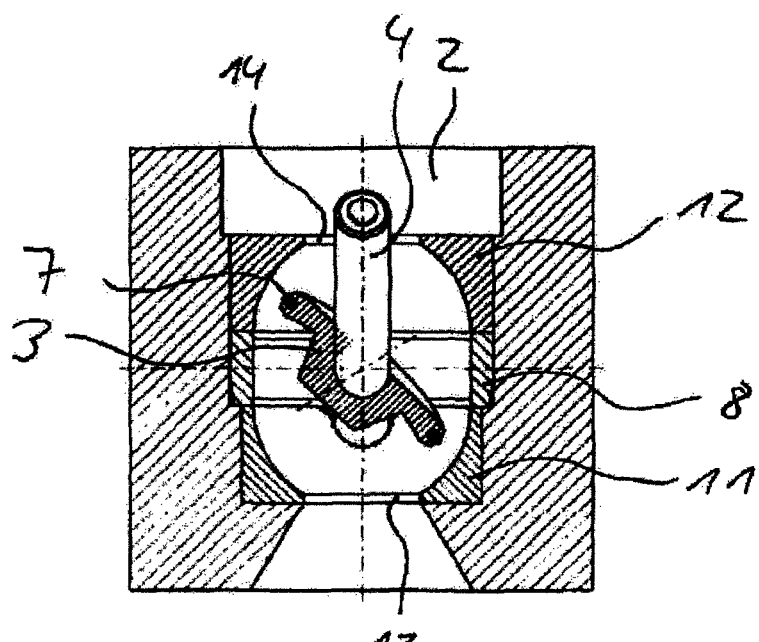

In FIG. 4, an insert 11, 12 is arranged to each side of the valve seat 8. The inserts 11, 12 are of the same design and are arranged such that the respective smallest cross sections 13, 14 are remote from the valve seat 8. This arrangement, in particular owing to the concave inner contour, yields a continuously changing cross section, which realizes a relatively good flow in the region of the valve seat 8 and of the inserts 11, 12. The two inserts 11, 12, owing to their design, create a region within the flow duct 2 with a volume adapted to the smaller maximum mass throughput, whereby the regulability of the mass throughput by virtue of the flap 3 arranged between the two inserts 11, 12 can be set very precisely.

Thus, while there have been shown and described and pointed out fundamental novel features of the invention as applied to a preferred embodiment thereof, it will be understood that various omissions and, substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve device for a motor vehicle, comprising:
a housing (1);
a flow duct (2) situated in the housing (1);
a flap (3) arranged in the flow duct (2) to close off the flow duct (2) in a closed position of the flap (3);
a spindle (4) extending through the flap (3), the flap (3) having regions in which the spindle (4) is fastened, the spindle (4) being mounted rotatably in the housing (1); and
a valve seat (8) having an inner diameter and an outer diameter, the valve seat (8) being a ring inserted and arranged in the flow duct (2) so as to contact with the flap (3) in the closed position of the flap (3),
wherein the flow duct (2) includes, adjacent to the valve seat (8), one or more sections (9, 10) having a cross section smaller than the inner diameter of the valve seat (8),
wherein at least one of the one or more sections (9, 10) of the flow duct (2) with the smaller cross section is formed, at least in part, by a downstream insert (11) arranged in the flow duct (2) downstream, with respect to the direction of flow, of the valve seat (8), the downstream insert (11) having an upstream-directed edge surface that is arranged and configured so as to contact a downstream-directed edge surface of the ring forming the valve seat (8), wherein downstream, with respect to the direction of flow, of the smaller cross section formed by the downstream insert (11) the flow duct (2) widens continuously over a portion of the flow duct, wherein at least a portion of the flow duct (2) upstream, with respect to the direction of flow, of the valve seat (8) is cylindrical and has a diameter greater than the inner diameter of the valve seat (8), wherein the one or more sections (9, 10) of the flow duct (2) with the smaller cross section are formed by the downstream insert (11) and an upstream insert (12), both being arranged in the flow duct (2), wherein the downstream and upstream respective inserts (11, 12) are arranged one at each side of the valve seat (8), both the downstream and upstream respective inserts (11, 12) having a smaller cross section than the inner diameter of the valve seat (8), the upstream insert (12) having a downstream-directed edge surface that is arranged and configured so as to contact an upstream-directed edge surface of the ring forming the valve seat (8), and wherein the outer diameter of the valve seat (8) is dimensioned such that the downstream insert (11) and the upstream insert (13) do not contact one another.

2. The valve device as claimed in claim 1, wherein the smaller cross section of at least one of the downstream and upstream respective inserts (11, 12) or of the flow duct (9) widens continuously up to the inner diameter of the valve seat (8).

3. The valve device as claimed in claim 1, wherein the valve seat (8) and/or the downstream and upstream respective inserts (11, 12) is/are screwed or pressed into the flow duct (2).

4. The valve device as claimed in claim 1, wherein the cross section (10) of at least one of the downstream and upstream respective inserts (11, 12) merges continuously into the cross section of the flow duct (2).

5. The valve device as claimed in claim 1, wherein the cross section of the flow duct (2) widens in cross section downstream of the valve seat (8).

\* \* \* \* \*